US010326789B1

(12) United States Patent
Vines et al.

(10) Patent No.: US 10,326,789 B1
(45) Date of Patent: Jun. 18, 2019

(54) WEB BOT DETECTION AND HUMAN DIFFERENTIATION

(71) Applicant: Amazon Technologies, Inc., Seattle, WA (US)

(72) Inventors: Forrest MacKenzie Vines, Bonney Lake, WA (US); Sevag Demirjian, Seattle, WA (US); Nathan David Scott, Seattle, WA (US); Jui Te Tseng, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/865,515

(22) Filed: Sep. 25, 2015

(51) Int. Cl.
*H04L 29/06* (2006.01)
*H04L 29/08* (2006.01)

(52) U.S. Cl.
CPC ...... *H04L 63/1441* (2013.01); *H04L 63/0281* (2013.01); *H04L 67/02* (2013.01)

(58) Field of Classification Search
CPC .. H04L 63/1441; H04L 63/0281; H04L 67/02
See application file for complete search history.

(56) References Cited

U.S. PATENT DOCUMENTS

| | | | |
|---|---|---|---|
| 7,516,220 B1 | 4/2009 | Stiert | |
| 8,311,876 B2 * | 11/2012 | House | G06Q 30/02 705/7.29 |
| 8,763,116 B1 | 6/2014 | Khanna et al. | |
| 8,838,570 B1 * | 9/2014 | English | H04L 63/1408 707/709 |
| 8,925,057 B1 * | 12/2014 | Ansari | G06F 21/31 382/181 |
| 9,076,013 B1 | 7/2015 | Bailey, Jr. et al. | |
| 9,361,446 B1 * | 6/2016 | Demirjian | G06F 21/36 |
| 9,424,414 B1 * | 8/2016 | Demirjian | G06F 21/36 |
| 9,444,795 B1 * | 9/2016 | Kowalski | H04L 63/0428 |
| 9,516,053 B1 * | 12/2016 | Muddu | H04L 63/1425 |
| 9,985,943 B1 * | 5/2018 | Reading | H04L 63/08 |

(Continued)

OTHER PUBLICATIONS

AlNoamany-Access Patterns for Robots and Humans in Web Archives, Jul. 22-26, 2013, ACM, pp. 339-348.*

(Continued)

*Primary Examiner* — Luu T Pham
*Assistant Examiner* — James J Wilcox
(74) *Attorney, Agent, or Firm* — Davis Wright Tremaine LLP

(57) ABSTRACT

Web Bot detection methods and systems are provided that receive a request, in connection with a network session. The methods and systems determine whether the request is associated with potential Bot activity, and based thereon assign a Bot confidence designation. The Bot confidence designation indicates a likelihood that the request represents an agent-based request. The methods and systems analyze a session trait of the network session relative to predetermined session traits indicative of human-based requests, and assign a human confidence designation based on the analysis. The human confidence designation indicates a likelihood that the request represents a human-based request. The request is then classified to represent an agent-based request or human-based request based on the Bot and human confidence designations.

20 Claims, 10 Drawing Sheets

(56) References Cited

U.S. PATENT DOCUMENTS

| | | | |
|---|---|---|---|
| 10,097,583 B1* | 10/2018 | Demirjian | H04L 63/20 |
| 2004/0117654 A1 | 6/2004 | Feldman et al. | |
| 2005/0015624 A1* | 1/2005 | Ginter | G06F 21/55 726/4 |
| 2005/0108569 A1* | 5/2005 | Bantz | H04L 63/1475 726/4 |
| 2006/0233344 A1* | 10/2006 | Das | H04M 3/527 379/265.02 |
| 2006/0253580 A1* | 11/2006 | Dixon | G06F 21/50 709/225 |
| 2006/0253581 A1* | 11/2006 | Dixon | G06F 17/30861 709/225 |
| 2006/0253582 A1* | 11/2006 | Dixon | G06F 17/30864 709/225 |
| 2006/0253583 A1* | 11/2006 | Dixon | H04L 63/1441 709/225 |
| 2006/0253584 A1* | 11/2006 | Dixon | G06Q 30/02 709/225 |
| 2007/0240217 A1* | 10/2007 | Tuvell | G06F 21/56 726/24 |
| 2008/0226058 A1* | 9/2008 | Das | H04M 3/527 379/265.12 |
| 2009/0089869 A1* | 4/2009 | Varghese | G06F 21/31 726/7 |
| 2010/0070620 A1* | 3/2010 | Awadallah | G06F 11/3485 709/224 |
| 2010/0281539 A1* | 11/2010 | Burns | H04L 63/1441 726/23 |
| 2011/0208714 A1* | 8/2011 | Soukal | G06F 21/552 707/709 |
| 2013/0160129 A1* | 6/2013 | Sartin | G06F 21/552 726/25 |
| 2013/0198203 A1* | 8/2013 | Bates | G06F 17/30861 707/748 |
| 2014/0189798 A1* | 7/2014 | Grimaud | G06F 21/36 726/4 |
| 2014/0344927 A1* | 11/2014 | Turgeman | H04W 12/06 726/22 |
| 2015/0310196 A1* | 10/2015 | Turgeman | G06F 21/552 726/19 |
| 2015/0326587 A1* | 11/2015 | Vissamsetty | H04L 63/1408 726/23 |
| 2016/0005029 A1* | 1/2016 | Ivey | G09C 1/00 705/44 |
| 2017/0032412 A1* | 2/2017 | Scharber | G06Q 30/0248 |
| 2017/0118240 A1* | 4/2017 | Devi Reddy | G06N 7/005 |
| 2017/0236370 A1* | 8/2017 | Wang | G07F 17/3241 463/25 |
| 2018/0160309 A1* | 6/2018 | Turgeman | G06F 21/316 |
| 2018/0322270 A1* | 11/2018 | Bailey | G06F 21/36 |
| 2019/0007523 A1* | 1/2019 | Walker | H04L 41/5022 |

OTHER PUBLICATIONS

Calzarossa—An Extensive Study of Web robots traffic, Dec. 2-4, 2013, ACM, pp. 1-8.*

* cited by examiner

WEB BOT DETECTION AND HUMAN DIFFERENTIATION

BACKGROUND

Traditionally, humans have been the primary source of Internet traffic experienced by network services (e.g., Web servers). However, more recently, a large increase has occurred in the number of requests to network services that are initiated by automated systems and certain computer programs, which are referred to as automated agents, automated robots or so-called "bots," provide tools that automate tasks, such as crawling through webpages to scan and gather keywords, text and links. Web Bots may exhibit sophisticated functionality and place widely varying demands upon Web servers to which the HTTP requests are directed. In some instances, the Web Bots may seek to access a Web server for legitimate reasons or malicious reasons. Regardless of the intent of the Web Bot, the demands imposed by Web Bots at times may overburden the capability of a Web server. When a Web server experiences excessive traffic, among other things, the Web server may begin to respond more slowly to human-based traffic or experience more significant consequences. Website designers and operators such as online merchants are engaged in an ongoing effort to manage Web Bot-based traffic seeking access to Web servers.

Bot detection systems have been proposed that seek to prevent the Web Bot activity from degrading the performance of the Web servers in connection with human-based requests/traffic. Conventional Bot detection systems typically identify a HTTP request from Bots based on the IP (Internet Protocol) address associate with the source of the HTTP request. The Bot detection systems scan incoming HTTP requests for IP addresses known to be associated with Bot systems. When traffic from a Bot associated IP address is identified, the traffic is handled in a particular manner. For example, the traffic may be quarantined when the IP address is associate with a Bot known to have a malicious intent, known to hack websites, known to seek individual user information or otherwise. As another example, when the IP address is associated with Bot activity (or Bot originated) that is considered "safe", the incoming request may still be managed in a manner that prevents degradation of human-based traffic.

However, some conventional Bot detection systems are not sufficiently robust and may inadvertently block traffic from customers (e.g., human based requests/traffic). In addition, Bot detection systems may return numerous "false positives" indicating apparent Bot attempts to access a website. In many instances, traffic identified as "Bot originated" may not in fact be Bot originated. For example, a single IP address may be utilized in connection with numerous users that are not related with one another, namely users associated with human originated traffic and users associated with Bot originated traffic. Thus, when the IP address is used as the basis to identify Bots, human traffic may be inadvertently identified as Bot traffic.

Accordingly, it is desirable for improved methods, systems and computer program products that detect and differentiate between human and Bot traffic.

DETAILED DESCRIPTION

Figure 1A:
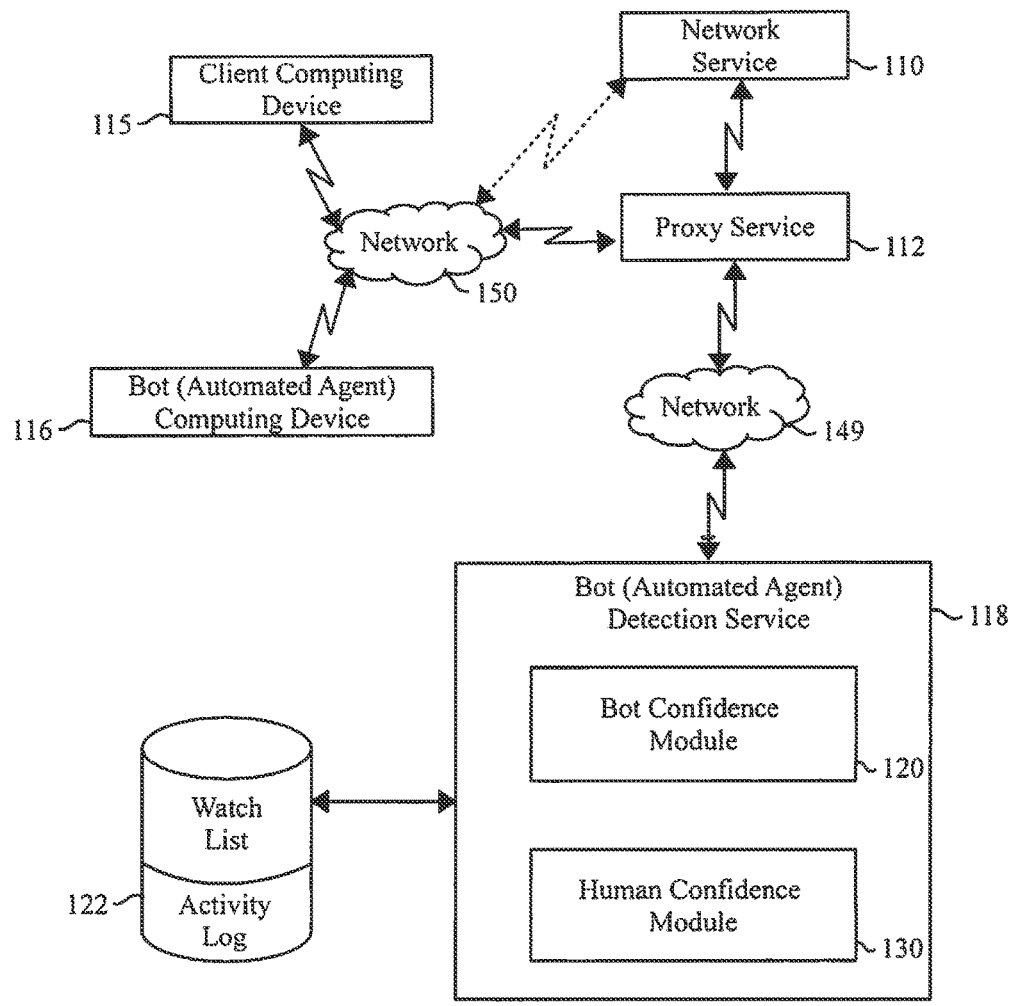
FIG. 1A illustrates an example system environment for protecting network services from automated computing devices in accordance with embodiments herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Network services process requests from a variety of sources, some of which are human-based and some are Bot-based. Bot related traffic may seek to access network services for a variety of reasons, both legitimate and inappropriate. Today, Bot-based requests/traffic has become closely integrated into human-based requests/traffic. Conventional Bot detection techniques either block the mix of Bot and human traffic or pass both the Bot and human traffic in total. Methods and systems are described herein that seek to differentiate between human-based requests/traffic and Bot-based requests/traffic (also referred to as a computer implemented automated agent-based request/traffic) that is received by a network service. The human-based requests/traffic is passed to the network service, while the Bot-based requests/traffic is blocked or otherwise processed accordingly. For example, when a large number of Bot-based requests are received by a network service, it may be desirable to quarantine, deny or at least temporarily suspend such HTTP requests while processing human-based requests, in order to avoid degrading a customer's experience when visiting a particular Website, Web service or other network service.

The methods and systems described herein avoid inadvertent classification of human traffic, as Bot traffic, by providing a multi-tiered detection and differentiation architecture that analyzes the traffic from different perspectives, namely from the perspective of Bot detection and from the perspective of human detection. At a first or upper tier of the architecture, a Bot confidence module assigns an initial rating to incoming request/traffic, where the rating is indicative of the potential that the request/traffic is from a Bot.

Some traffic may be rated as Bot-based with a high level of confidence, while other traffic may be rated as Bot-based with a medium or low level of confidence.

A second or lower tier of the architecture implements a human confidence module that analyzes traffic receiving low or intermediate rating by the Bot confidence module at the upper tier of the architecture. The human confidence module analyzes the traffic from a human perspective by analyzing one or more session traits of a network session associated with the traffic in an effort to identify human related behavior, instead of seeking to identify Bot related traits. By analyzing sessions for human related behavior, the human confidence module is able to distinguish human based sessions, even if originating from the same IP address as Bot based sessions. The human confidence module avoids the difficulties experienced by other Bot detection schemes that must constantly evolve to keep up with new Bot behavior.

The methods and systems herein provide various technical advantages over existing Bot detection systems. For example, network services are protected from sophisticated adaptive Bots. Even as Bots continue to evolve and become smarter or more adaptable at circumventing Bot protection schemes, the methods and systems herein are still able to block such Bots without blocking human traffic. Blocking Bot traffic reduces the demand upon network services and permits fewer physical servers to be used, as well as permitting network services to run more efficiently. Reducing the number of overall servers decreases the basic cost to implement and maintain a network service. Efficiently discriminating between individual Bot sessions and human sessions allows the network service to avoid interruption/ rejection of the human service and provide a better overall customer experience. In general, human related traffic exhibits certain human related traits that are difficult to simulate by a Bot. Hence, by monitoring the human related traits, the Bot detection services herein are able to identify human-based traffic in a relatively quick and efficient manner, thereby enabling the network service to promptly and properly respond to such network requests without experiencing performance degradation due to excessive Bot-based traffic.

It is recognized, that while the terms "webpage", "website", "web application", "Web server" and other similar terms are used throughout in connection with explaining various embodiments, the principles and aspects described herein are not limited to web-based pages, sites, applications and servers. Instead, the principles described herein extend to other types of structured networks and generally applied to any network service or network resource that receives user inputs as requests/parameters and returns resource content to the user.

The terms robot, Bot or Web Bot are used to refer a computing devices that have been specifically configured with computer implemented instructions to carry out one or more specific tasks on a network (e.g., the Internet) without the need for continual human interaction. The term "Bot" is used interchangeably with the term "computer implemented automated agent". Non-limiting examples of automated computing devices include search engine spiders, crawlers, and the like (hereafter collectively "Bots") that automate tasks, such as crawling through webpages to scan and gather keywords, text and links. For example, a Web Bot may represent a Web crawler that is utilized by an Internet search engine to work through pages on the Internet, following the links encountered, in order to provide a useful resource to the search engine users. Another example is an entity that carries out a set of instructions continuously (e.g., in connection with web-sites that operate points or reward schemes, wherein points are allocated for various actions). The Web Bot may carry out the appropriate actions to obtain points. Other types of Web Bots may carry out malicious actions such as attempts to collect user information regarding personal accounts and the like.

As used herein, the term Bot activity (also referred to as a computer implemented automated agent activity) generally refer to activity by an automated process managed and/or controlled by a third-party seeking to interact with the network service and/or clients utilizing the network service, in a manner that is unauthorized and unintended by the developer, manager, operator or other entity responsible for or associated with the webpage, website or Web application.

As used herein, the terms "human-based" refers to actions that are taken by a human while operating a client computing device. The term "human-based request" refers to requests initiated by a human while operating a client computing device, such as while a human is engaged in a network session. The terms "human-based behavior" and "human-based session behavior" refer to activity associated with one or more traits that are indicative of people or human beings, and not by automated network agents (or more generally not by Bots). Non-limiting examples of traits include a number of webpages visited during one or more network sessions, a time spent at a webpage in connection with one or more requests or sessions, an overall duration of a network session, browser patterns followed when navigating through links on a network resource, transitions between network resources (e.g., Web pages). The traits associated with "human-based behavior" and "human-based session behavior" may be modeled. For example, a trait may be modeled relative to confidence designators, such as by plotting a relationship between the trait and confidence designators. The amount/degree of activity related to the trait indicates a likelihood that a human being is generating a request, where the likelihood increases or decreases as the amount/degree of activity increases or decreases based on the particular model.

FIG. 1A illustrates an example system environment for protecting network services from automated computing devices in accordance with embodiments herein. The example system environment comprises a Bot protection system that includes a proxy service 112 and a Bot detection service 118. The proxy service 112 is provided in connection with a network service 110 that it is desirable to protect from Bot activity. The proxy service 112 is communicatively coupled over a network 149 to the Bot detection service 118. Optionally, the proxy service 112 may be integrated (e.g. implemented upon a common server) with the Bot detection service 118.

In various embodiments, the Bot detection service 118 may be separate from the network service 110 or combined with the network service 110. For purposes of illustration, the Bot detection service 118 is depicted as separate from the network service 110 in FIG. 1A but coupled through network 149. The Bot protection system may comprise one or more computing devices, any of which may be implemented by the example computing devices illustrated and described herein. In various embodiments, the functionality of the different components may be provided by the same computing device or by different computing devices.

The proxy service 112 receives HTTP requests directed to the network service 110 and initially reroutes such HTTP requests to the Bot detection service 118. Human based HTTP requests may originate at client computing devices 115 under the direction of a valid user/human. Bot based HTTP requests may originate at Bot computing devices 116.

As explained herein, the Bot detection service 118 distinguishes between valid user client computing devices 115 and Bot computing devices 116. In accordance with at least one embodiment, all HTTP requests received from the network 110 are routed through the proxy service 112, and not directly to the network service 110. As explained herein, the proxy service 112 may determine whether to pass an HTTP request on to the network service 110. In the event that the network service 110 directly communicates with the network 150, the network service 110 does not respond to the HTTP request until receiving an approval to do so from the proxy service 112. Optionally, the network service 110 may convey all responses through the proxy service 112, and/or bypass the proxy service 112, once approval is obtained indicating that an HTTP request is associated with a client computing device 115.

The proxy service 112 may represent a network device, fleet of devices, a Web server, etc. The proxy service 112 resides alongside the network service 110 for which access is sought, monitors incoming requests and accesses requests (generally HTTP requests) made to the network service 110. Optionally, the proxy service 112 may reside independently of the network service 110, such as elsewhere on a server or on a separate server for example, or the like and still operate to monitor access. The proxy service 112 may temporarily prevent the HTTP request from passing to the network service 110 and instead passes the incoming HTTP request to the Bot detection service 118. Alternatively, the network service 110 may receive all HTTP requests but wait for instructions from the proxy service 112 before processing/denying the request. As explained herein, the Bot detection service 118 determines a traffic classification associated with the HTTP request, where the traffic classification indicates whether the HTTP request is associated with (originates from) a Bot computing device 116 or a client computing device 115. For example, the Bot detection service 118 may return a YES/NO determine whether the HTTP request is associated with the human-based client computing device 115 or the Bot-based client computing device 116 (also referred to as a computer implemented automated agent client computing device). Optionally, the Bot detection service 118 may return a classification including a confidence designation such as a "high confidence", "medium confidence" or "low confidence" Bot designation. A Bot confidence high designation indicates that a high probability exist that the HTTP request originated from a Bot computing device, while medium and low confidence Bot designations indicate corresponding medium and low probabilities exist that the HTTP request originated from a Bot computing device.

The proxy service 112 decides an appropriate action based on the returned traffic classification. For example, the proxy service 112 may take no action and pass the HTTP request to the network service 110 for normal processing when the traffic classification indicates that the HTTP request is associated with a valid user/human (e.g., when the confidence designation represents a NO or low confidence Bot). Alternatively, when the traffic classification indicates that the HTTP request is associated with a Bot (e.g., when the confidence designation represents a YES or Bot confidence high), the proxy service 112 may deny or quarantine the HTTP request and/or handle the HTTP request in an alternative manner. As a further example, the proxy service 112 may perform predetermined special actions when the traffic classification returns an indication of a special action. For example, the special action may instruct the proxy service 112 to generate or utilize preventative measures that afford limited access by the Bot, or add additional tracking tags/markers to track detailed actions taken during a network session associated with the request. In one embodiment, the Bot detection service 118 may be managed by a website developer, an online merchant, a website management service and the like. The Bot detection service 118 may be utilized continuously, intermittently or periodically throughout operation of a production webpage, website or Web application.

The Bot detection service 118 is constructed with a multi-tiered architecture having a first/upper tier and a second/lower tier. The first/upper tier includes a Bot confidence module 120, while the second/lower tier includes a human confidence module 130.

The Bot confidence module 120 analyzes all or at least a portion of incoming requests directed to static or dynamic webpages, websites and Web applications. The Bot confidence module 120 performs an initial analysis of the HTTP request to decide/assign an initial confidence designation indicative of whether the HTTP request originates from a Bot or a valid user. By way of example, the Bot confidence module 120 may determine the source IP address from which the HTTP request originated and compare the source IP address to one or more lists of IP addresses. For example, a blocked Bot list may be maintained designating IP addresses known to be associated with unauthorized Bot computing devices. As other examples, the blocked Bot list may be configured to include information identifying the request and/or the requestor as well as a score indicating the likelihood of the request being generated by an automated agent. The identifying information may include a signature based at least in part on the IP address of the requestor, a cookie associated with the request, a token associated with the request, a parameter associated with the request, a customer account associated with the request, a session associated with the request, an identification number associated with the request, purchase history associated with the request or other information capable of identifying a requestor associated with a request.

Optionally, a human/unblocked list may be maintained designating IP addresses known to be associated with valid client computing devices. As a further example, the unblocked list may maintain IP addresses that have been designated to be associated with "unblocked" Bot computing devices, namely, where the particular Bot computing devices on the unblocked list have been validated, determined to be harmless or otherwise authorized to access the network service. For example, certain types of automated searches may be innocuous or otherwise authorized to be performed on or in connection with network services. The source IP address is compared to the blocked list and the unblocked list, and based on the comparison, an initial confidence designation is assigned. For example, when the source IP address is associated with the blocked list, a Bot confidence high designation may be assigned and automatically returned as the traffic classification to the proxy service 112 (without further analyzing the HTTP request at the human confidence module 130). As another example, when the source IP address is associated with the unblocked list, a valid user designation may be assigned and automatically returned as the traffic classification to the proxy service 112 (without further analyzing the HTTP request at the human confidence module 130).

When the Bot confidence module 120 is unable to assign a Bot confidence high designation or valid user high designation, the Bot confidence module 120 may assign a low or medium confidence Bot designation. In response thereto, the HTTP request is passed to the human confidence module 130 for additional processing.

The human confidence module 130 performs an analysis of the HTTP request that is designed to analyze traffic traits strongly associated with (or highly indicative of) human behavior (also referred to as human-based session behavior). The human-based session behavior is defined by session traits indicative of human-based requests. For example, the human confidence module 130 may analyze a session history for all or a subset of requests and responses, associated with a current network session, between the network service 110 and the client/Bot computing device 115, 116. As explained herein, the proxy service 112 assigns a session ID to each network session and the Bot detection service 118 tracks various activity of interest from requests/responses within the network session. The analysis involves, among other things, reviewing the type of activity data that has been conducted during the network session. Examples of activity data may include the number of webpages visited, the time spent at each webpage, overall session duration and the like. As more requests/responses occur in connection with an individual network session, the human confidence module 130 builds a more detailed and longer term session history. The session activity may be determined in part from cookies and/or other information within the header or another portion of the HTTP request.

At times, Bot computing devices may not save cookies and thus each HTTP request from a Bot computing device may appear as a new session. However, Bot-based sessions may seek to access a website for a very short period time or multiple times for short intervals. Normal human traffic traits may not exhibit multiple HTTP requests to a website, where each HTTP request only persists for a short period of time, and where the HTTP request lack cookies or is not otherwise associated with a prior network session. The foregoing is one example of the type of activity that may be analyzed at the human confidence module 130.

As explained herein, the human confidence module 130 records certain traits of interest from the traffic in an activity log, and reviews past traits from the activity log when a new HTTP request is received. For example, the human confidence module 130 may monitor failed page requests, failures associated with forms or other system accesses, the re-occurrence of IP addresses seeking connection to a network resource (e.g. Web site), cookie modifications, updates to header information in the HTTP request and the like.

Optionally, the human confidence module 130 may also utilize watch lists (e.g., watch list containing information designating valid users). The human confidence module 130 may track the occurrences of user registration, track profiles and other details, including email or physical addresses, domains and access times, etc. As noted herein, one indication of Bot traffic behavior represents the frequency and duration of web-site visits by a user agent or a number of user agents. By monitoring the frequency of website visits (and duration of each visit) associated with an individual user agent, the human confidence module 130 may identify a pattern of use that may be attributed to human traffic behavior. For example, if a user agent accesses a network resource or website site multiple times in a very short duration (e.g., ten times per second), this may be considered a trait that diverges from normal human traffic behavior and is highly indicative of Bot traffic behavior.

The human confidence module 130 may analyze other activity in search of anomalous behavior, such as by collecting certain transaction or access details. For example, the human confidence module 130 may track failed attempts, by maintaining a running log of the failed attempts to access an individual network resource by a particular user agent and IP address. Normal human traffic behavior may exhibit a certain number of failed attempts, distributed over an expected period of time, after which the human user would cease attempting to access the network resource. Hence, when a particular user agent continues to attempt to access a network resource (beyond a reasonable number of times), such behavior may be deemed divergent from normal human traffic behavior.

The human confidence module 130 generates a human confidence designation (e.g., a score, rating or rank) indicating a confidence or likelihood that the HTTP request originated from a valid user. The human confidence module 130 tracks HTTP request that are received. As one example, the human confidence module 130 may represent a distributed counting system that counts incoming session identifiers. The human confidence module 130 may utilize machine learning (e.g., heuristic based) or a predefined model that utilizes the count of session identifiers (and/or count of other traits) to determine what combination or combinations of counts are indicative of Bot behavior and what combination or combinations of counts are indicative of human behavior.

For example, the count may correspond to the number of user agents associated with a particular IP address and/or the number of requests from one user agent to a URL. For example, one IP address may have multiple user agents, however one user agent may make an excessively large number of requests to one URL. The traffic associated with other user agents at the URL may exhibit fewer requests and be distributed between numerous URLs. Normal user traffic may not exhibit such a high number of requests to any one URL.

One example of a normal human user agent may be a purchasing agent, who undertakes a relatively large number of requests to a common URL, but where each HTTP request may include certain types of content expected of a purchasing agent (e.g. multiple page types that include JavaScript activity and other expected content). Accordingly, HTTP requests exhibiting the expected traits would correspond to normal human traffic. The human confidence module 130 provides a corresponding human confidence designation based on the analysis of the trait(s) of interest from the activity log.

The Bot detection service 118 may combine the Bot and human confidence designations provided by the Bot and human confidence modules 120 and 130, and return the combination within the traffic classification. As one example, the Bot and human confidence designations may be afforded different weights, where a weighted sum is returned as the traffic classification. In certain instances, it may be desirable to assign a greater weight to the human confidence designation, while in other instances, it may be desirable to assign a greater weight to the Bot confidence designation. Optionally, the Bot and human confidence designations may be returned separately within the traffic classification to the proxy service 112.

Optionally, the human confidence module 130 may perform session analysis based upon traits of interest other than user agent. For example, the session analysis may be based upon traits derived from headers, cookies, request properties and the like. As other examples, the session analysis may count the properties of the request, count transitions between requests and the like.

Optionally, the human confidence module 130 may store and analyze, as traits of interest, interaction data regarding the interaction between the proxy service and user agents. For example, the interaction data may correspond to mouse movements, keyboard entries, and others data representative of the interaction of a client/Bot computing device 115, 116 with a network resource (e.g. website). The foregoing example enables offloading of processing of interaction data (e.g. mouse movement data, keyboard data, etc.) to the human confidence module 130, thereby freeing up processing bandwidth of the Bot confidence module 120, proxy service 112 and network service 110. The foregoing example limits the analysis of interaction data to the subset of overall HTTP requests (identified by the Bot confidence module 120), thereby avoiding unduly burdening the overall network service with analyzing interaction data for every HTTP request. Instead, the interaction signals/data is reviewed only in connection with HTTP requests that fall within a certain range of confidence designations.

The client/Bot computing devices 115, 116, proxy service 112, network service 110, and Bot detection service 118 are implemented by one or more processors that are communicatively coupled to one or more data stores and/or memories that store various data, information and program instructions directing the processors to operate as explained herein.

Other examples of models include browser patterns that may be detected during a network session. For example, the activity data may relate to the pattern of actions performed by the browser, such as conducting a search, selecting an item/product, chose to add an item to an e-commerce shopping cart. Human-based session behavior may be indicated when the activity data indicates that a series of requests were presented to first search for one or more products, then to select an individual webpage associated with a product, then to add the product to the shopping cart. In contrast, bot-based session behavior may be indicated with the activity data indicates that a series of requests presented a search and then selected most or all of the items/products. Bot-based session behavior may be indicated when activity data is uniform (e.g., multiple searches followed by an equal number of product selections) and/or exhibits a narrow distribution.

Optionally, a logical order in which network resources are accessed may be indicative of human-based session behavior. For example, when activity data indicates that an order of requests began with a product page, then conducted a search, then added an item to a shopping cart, this order is not normally followed by humans and would be attributed a low human confidence designation. Alternatively, when the order of requests begin with a search, followed by selection of a product page, followed by adding the product to the shopping card, this order of requests is followed by humans and would be attributed a high human confidence designation.

Additionally or alternatively, the Bot detection service 118 may represent a remote computing service, such as offered with a collection of remote computing services that form a cloud computing platform. As one example, the collection of network services may represent the network services offered by Amazon Web Services, Inc. The functionality of the Bot detection service 118 may be implemented, as a remote computing service, for various subscribers, such as e-commerce businesses, to scan various network services offered by the e-commerce businesses for vulnerabilities. As another example, the Bot detection service 118 may be offered through a cloud computing service, such as Amazon Elastic Compute Cloud (Amazon EC2) or another network service that provides resizable compute capacity in the cloud.

Figure 1B:
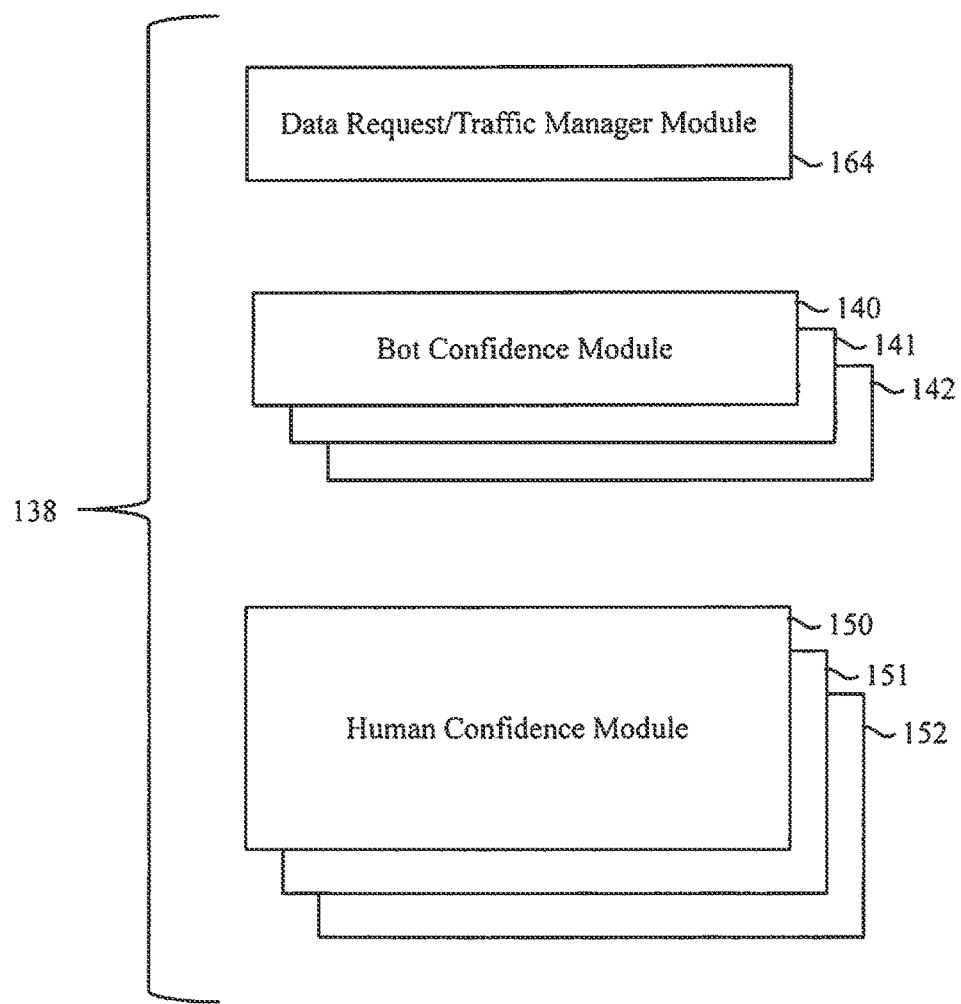
FIG. 1B illustrates a Bot detection service formed in accordance with an alternative embodiment.

FIG. 1B illustrates a Bot detection service 138 formed in accordance with an alternative embodiment. The Bot detection service 138 is comprised of multiple Bot confidence modules 140-142 and multiple human confidence modules 150-152. Optionally, multiple Bot detection services 138 may be operated in parallel.

In the example of FIG. 1B, the Bot detection service 138 provides a distributed processing service in which one or more processors may be operated in parallel to perform the various related functions and operations. For example, one proxy service (112 in FIG. 1A) may convey various HTTP requests to the Bot detection service 138. A HTTP request/traffic manager module 164 routes the various HTTP requests to a select Bot confidence module 140-142. For example, the HTTP request may be routed between various Bot confidence modules 140-142 based on available processing bandwidth for the individual Bot confidence module 140-142. The Bot confidence modules 140-142 identify a Bot confidence designation in connection with each HTTP request and returns the Bot confidence designation to the manager module 164. Based upon the confidence designation, the manager module 164 then routes appropriate HTTP requests to an available human confidence module 150-152. The human confidence modules 150-152 may all perform a similar type of analysis (related to one or more common traits of interest). Additionally or alternatively, different types of human confidence modules 150-152 may be provided. For example, the human confidence module 150 may perform a first type of analysis on an individual HTTP request (e.g. based on a first set of one or more human traffic traits), while a second human confidence module 151 analyzes the same HTTP request utilizing a second type of analysis (e.g. based on a second set of one or more human traffic traits). The embodiment of FIG. 1B provides a distributed processing environment to facilitate more efficient processing of numerous HTTP requests.

The manager module 164, and Bot and human confidence designators 140-142 and 150-152 are implemented by one or more processors that are communicatively coupled to one or more data stores and/or memories that store various data, information and program instructions as explained herein.

Figure 2A:
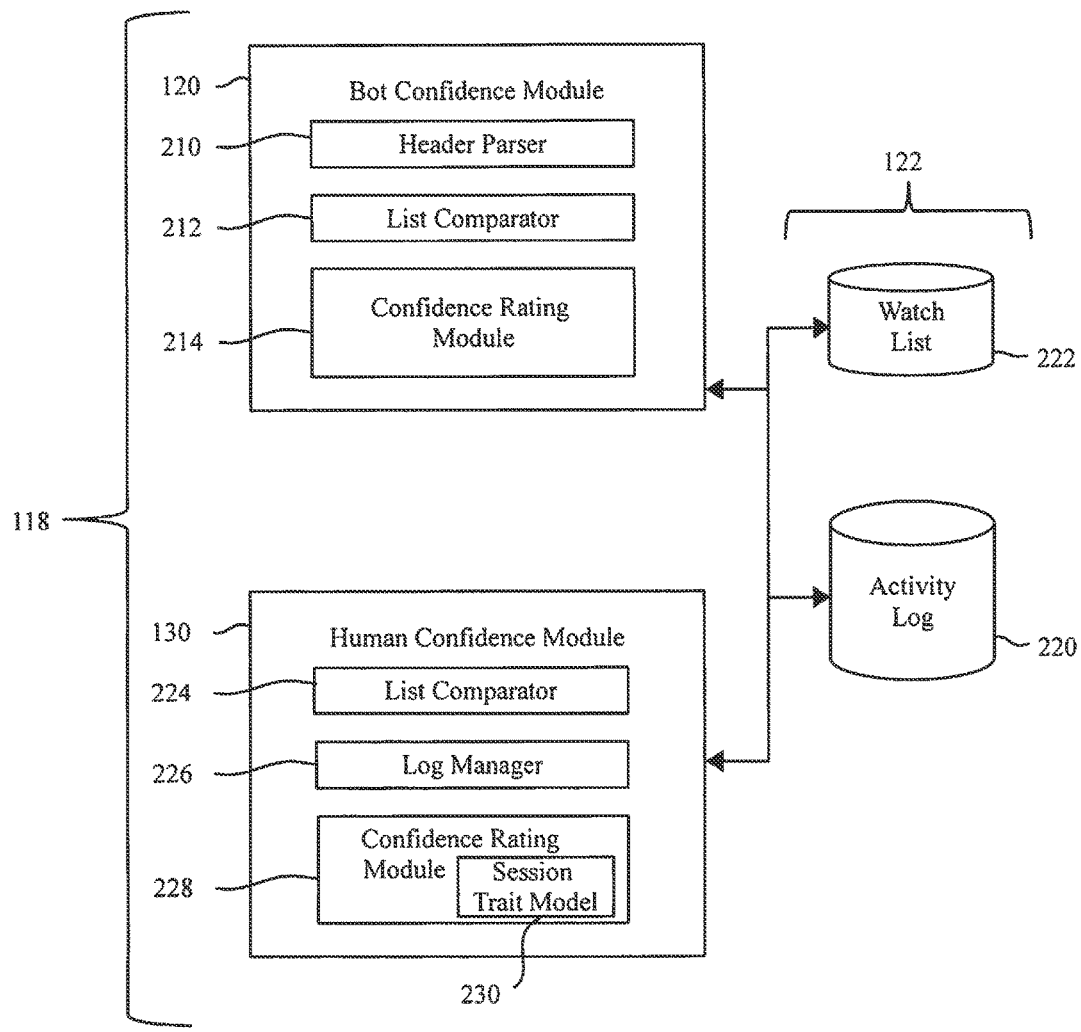
FIG. 2A illustrates a block diagram of an example Bot detection service 118 formed in accordance with embodiments herein.

FIG. 2A illustrates a block diagram of the Bot detection service 118 (also referred to as an automated agent) formed in accordance with embodiments herein. FIG. 2A illustrates examples of more detailed modules within the Bot confidence module 120 and human confidence module 130. The modules include a header parser 210, list comparator 212, and a confidence rating module 214. The various modules within the Bot confidence module 120 interact with various information stored in data store 122. For example, the data store 122 may store an activity log 220 and a watch list 222 including one or more unblocked list and/or blocked list. The header parser 210 steps through the content of an incoming HTTP request to identify request properties of interest, such as a desired portion of a header or field within the HTTP request.

The list comparator 212 compares the request property of interest (POI) to one or more watch list. For example, when the IP address represents the request POI, the list comparator 212 compares the IP address of the incoming HTTP request with the blocked list and/or unblocked list of IP addresses in the watch list 222. When the incoming IP address matches an IP address on the blocked list, this is taken as an indication that the incoming HTTP request represents a Bot-based request that originated with a Bot computing device 116. The likelihood that the incoming HTTP request originated from a Bot computing device 116 may depend on the type of watch list (e.g., a watch list of high confidence Bot IP addresses, a watch list of medium confidence Bot IP addresses). Alternatively, when an incoming IP address matches an IP address on the unblocked watch list, this is taken as a medium/strong indication that the incoming HTTP request originated from a client computing device 115 (associated with a valid user). Optionally, the list comparator 212 may compare other fields within the header of the HTTP request to corresponding lists.

The confidence rating module 214 generates a Bot confidence designation (RCD) based on the determination by the list comparator 212. The confidence rating module 214 may assign a YES/NO designation identifying an HTTP request to correspond to a Bot source or not to correspond to a Bot source. Alternatively, the confidence rating module 214 may provide various levels of confidence, such as high, medium or low confidence designations (or ranking between 1 and 10, etc.) indicating a relative level of likelihood or certainty that a particular HTTP request originated at a Bot. The RCD is passed to the human confidence module 130.

The human confidence module 130 includes a list comparator 224, a log manager 226 and a confidence rating module 228. The list comparator 224 compares request properties of interest to one or more lists. The information compared at list comparator 224 differs from the information compared at comparator 212. For example, the comparator 224 may compare an incoming user agent, cookie, and the like with a list in the watch list 222. Optionally, the comparator 224 may be omitted entirely and no list based comparison made at the human confidence module 130.

The log manager 226 is utilized to track certain types of activity data and to save the activity data in the activity log 220 uniquely associated with one or more session identifiers. The session traits of interest in the activity data are later analyzed by the confidence rating module 228 for human based session behavior. For example, the confidence rating module 228 includes one or more session trait models 230 (corresponding to models 270, 280, 290 (FIG. 2C)) that analyze the activity data relative to a session trait of interest and output an indication regarding how strongly the session trait from the activity data correlates to human based session behavior. Operations performed by the confidence rating module 228 and session trait model 230 are discussed in more detail below in connection with FIG. 6 to apply one or more models, such as models 270, 280, 290.

Figure 2B:
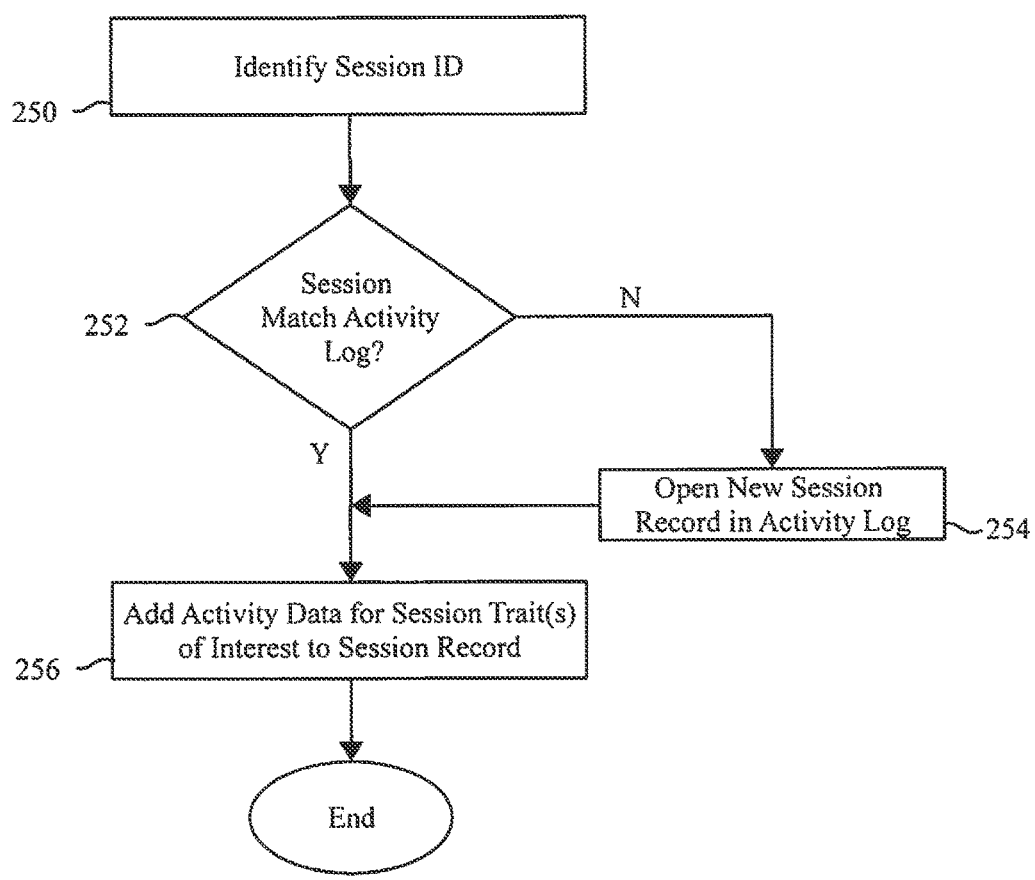
FIG. 2B illustrates a process implemented by the log manager 226 in accordance with embodiments herein.

FIG. 2B illustrates a process implemented by the log manager 226 in accordance with embodiments herein. At 250, the log manager 226 identifies the session ID from the incoming HTTP request. The session ID is a unique number that network server 110 (FIG. 1A) assigns a specific computing device for the duration of that computing device's visit (session) to a network service. The session ID can be stored as a cookie, form field, or URL (Uniform Resource Locator). Optionally, the network server 110 and/or proxy service 112 (FIG. 1A) may generate session IDs by simply incrementing static numbers. As noted above, the HTTP request has an associated session ID assigned thereto. The session ID is assigned by the proxy service 112 when the HTTP request is received or is already present in the HTTP request (having been assigned in a prior HTTP request). At 252, the log manager 226 accesses the activity log 220 and determines whether the activity log 220 already has a session record associated with the session ID. When a session record does not already exist, flow moves to 254, where a new session record is opened in the activity log 220. At 256, the session record (new or pre-existing) is updated to add activity data for one or more session traits of interest from the HTTP request. The foregoing process is performed in connection with each HTTP request processed by the human confidence module 130 (FIG. 2A). Optionally, the process of FIG. 2B may be performed in connection with additional HTTP requests, such as requests that were processed by the Bot confidence module 120 and determined to not warrant further analysis. Optionally, it may be desirable to maintain session records for all HTTP requests, regardless of whether designated to have high or low Bot or human confidence in order to build a detailed activity log for all types of requests.

In the represent example, the session ID is used to track session traits in the activity log. Optionally, other characteristics may be used instead of or in addition to session ID. For example, individual source computing devices, such as individual client or Bot computing devices 115, 116 (FIG. 1A), may be uniquely designated in various manners, such as based on a combination of the values in the fields in the header. For example, an individual client computing device 115 or Bot computing device 116 may be uniquely identified based on a unique combination of IP address, port and user agent. Alternatively other fields from the header and/or other information from the HTTP request (outside of the header) they be used to uniquely identify a client or Bot computing device, where such unique identifiers are used to track activity in the activity log.

Returning to FIG. 2A, the log manager 226 may track various types of information (generally referred to as activity data) depending on what inputs are of interest for the session trait model 230. For example, the input for the session trait model 230 may be the number of times that an individual source computing device visits a particular network resource. Additionally or alternatively, an input may be the number of times that an individual source computing device provides a particular type of HTTP request to a network service being monitored. Additionally or alternatively, an input may be the duration of each session, in which an individual source computing device visits a network resource or network service. The session record is populated with the various properties of interest (also referred to as activity data) from the incoming HTTP request. Thereafter, when the source computing device associated with the session ID conveys a subsequent HTTP request to the network service, the session record is updated with additional activity data. The unique session IDs and activity data are stored and updated in the activity log 220 in order to track over time various session traits of interest.

The confidence rating module 228 uses the information obtained from the comparator 224 and from the session trait module 230 to assign a confidence designation to the individual HTTP request. The confidence designation indicates a likelihood that the request originated from a valid user of a client computing device 115 (FIG. 1A). The confidence rating module 228 generates a human confidence designation based on one or more models 230 that receive input information from the determination by the comparator 224 and/or receive the content of the activity log 220. Based on the model(s) 230, the confidence rating module 228 may assign a YES/NO designation identifying an HTTP request to correspond to a human source or not to correspond to a human source. Alternatively, the confidence rating module 214 may provide various levels of confidence, such as high, medium or low confidence designations indicating a relative level of likelihood or certainty that a particular HTTP request originated at a human.

The header parser 210, watch list comparator 212, confidence rating module 214, list comparator 224, log manager 226 and confidence rating module 228 are implemented by one or more processors that are communicatively coupled to one or more data stores and/or memories that store various data, information and program instructions directing the processors to operate as explained herein.

Figure 2C:
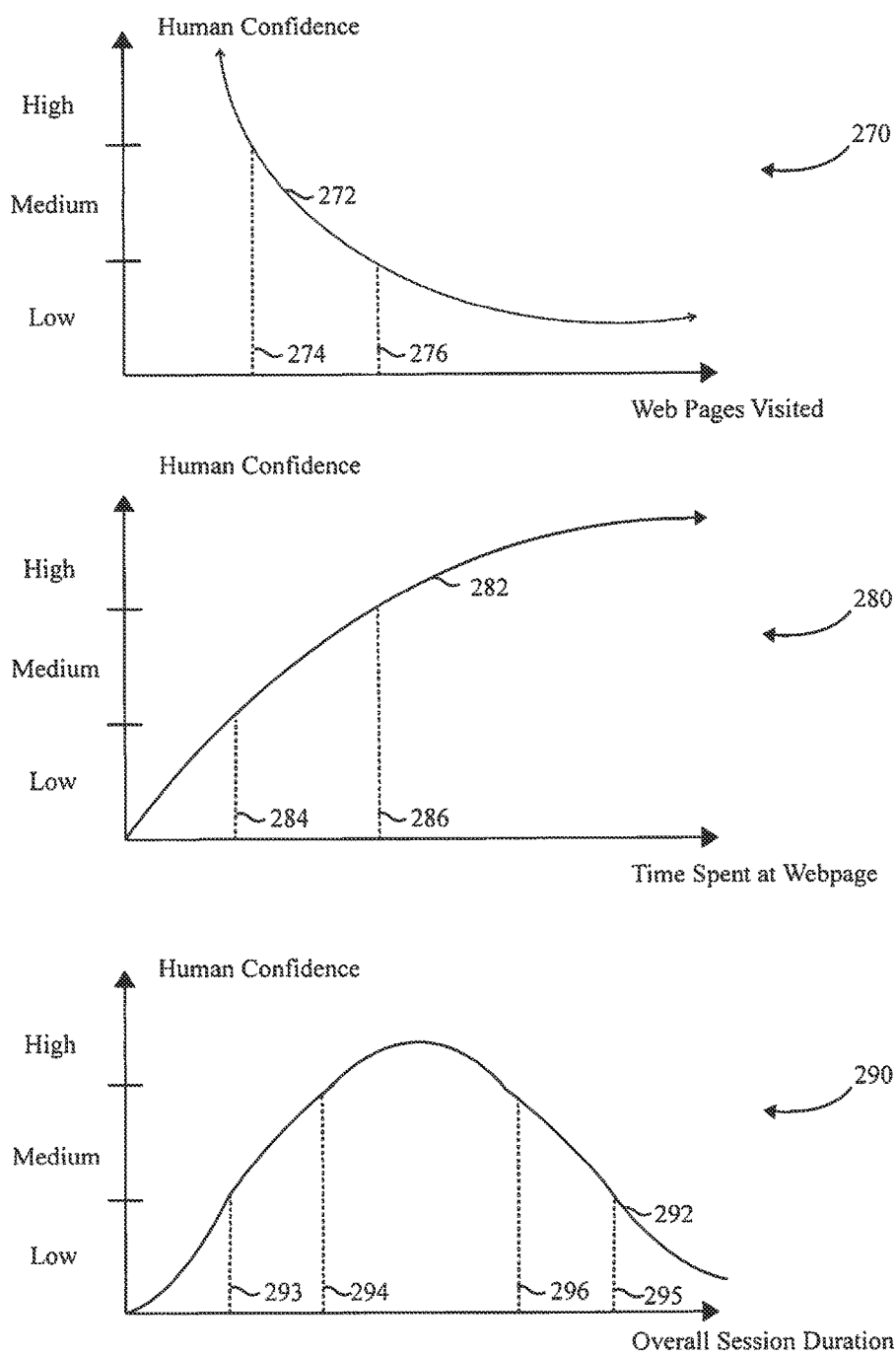
FIG. 2C illustrates example session trait models that may be utilized in accordance with embodiments herein.

FIG. 2C illustrates example session trait models that may be utilized in accordance with embodiments herein. The session trait models plots one or more predetermined session traits relative to human confidence designations indicating likelihoods of human-based requests or human-based session behavior. The models plot one or more session traits along the horizontal axis and a confidence designation along the vertical axis. For example, a webpage visit model 270 plots a number of webpages visited during a single network session relative to a confidence designation that the behavior represents human-based session behavior. The graph 272 indicates that when the number of visits to a particular webpage are below a threshold 274, the model 270 associates a high confidence that the session behavior is human-based. When the number of visits to the particular website are between the thresholds 274 and 276, the model 270 associates a medium confidence that the session behavior is human-based. When the number of Web page visits exceeded the threshold 276, the model 270 indicates a low confidence that the session behavior is human-based, or more directly is more likely to be Bot based.

A visit duration model 280 plots and amount of time spent at a particular webpage during a single network session relative to a confidence designation that the behavior represents human-based session behavior. The graph 282 indicates that when the duration of a visit to a particular webpage is below a threshold 284, the model 280 associates a low confidence that the session behavior is human-based. When the duration of the visit to the particular website is between the thresholds 284 and 286, the model 280 associates a medium confidence that the session behavior is human-based. When the duration of the Web page visit exceeds the threshold 286, the model 280 indicates a high confidence that the session behavior is human-based, or more directly is less likely to be Bot based.

An overall session length model 290 plots an overall duration of a single network session relative to a confidence designation that the behavior represents human-based session behavior. The graph 292 indicates that when the overall duration exhibits a "bell curve" shape such that the session exhibits human based session behavior when the overall session length is between thresholds 294 and 296. The model 290 indicates a medium confidence of human-based session behavior when the session duration is between the thresholds 293 and 294, or between the thresholds 295 and 296. The model 290 indicates a low confidence of human-based session behavior when the session duration is below the threshold 293 or above the threshold 295.

It is recognized that the models of FIG. 2C are merely examples. The models 270, 280 and 290 may vary, such as to have different shapes, plot different session traits and apply different types of confidence scores. Optionally, multiple session traits may be plotted within a single model, where various combinations of session traits are assigned associated confidence scores. Optionally, the models may simply represent threshold values that are applied to activity data in accordance with individual network sessions. It is recognized that a wide variety of models may be applied, including various algorithms and heuristics to analyze activity data in various manners indicative of human-based session behavior.

Figure 3:
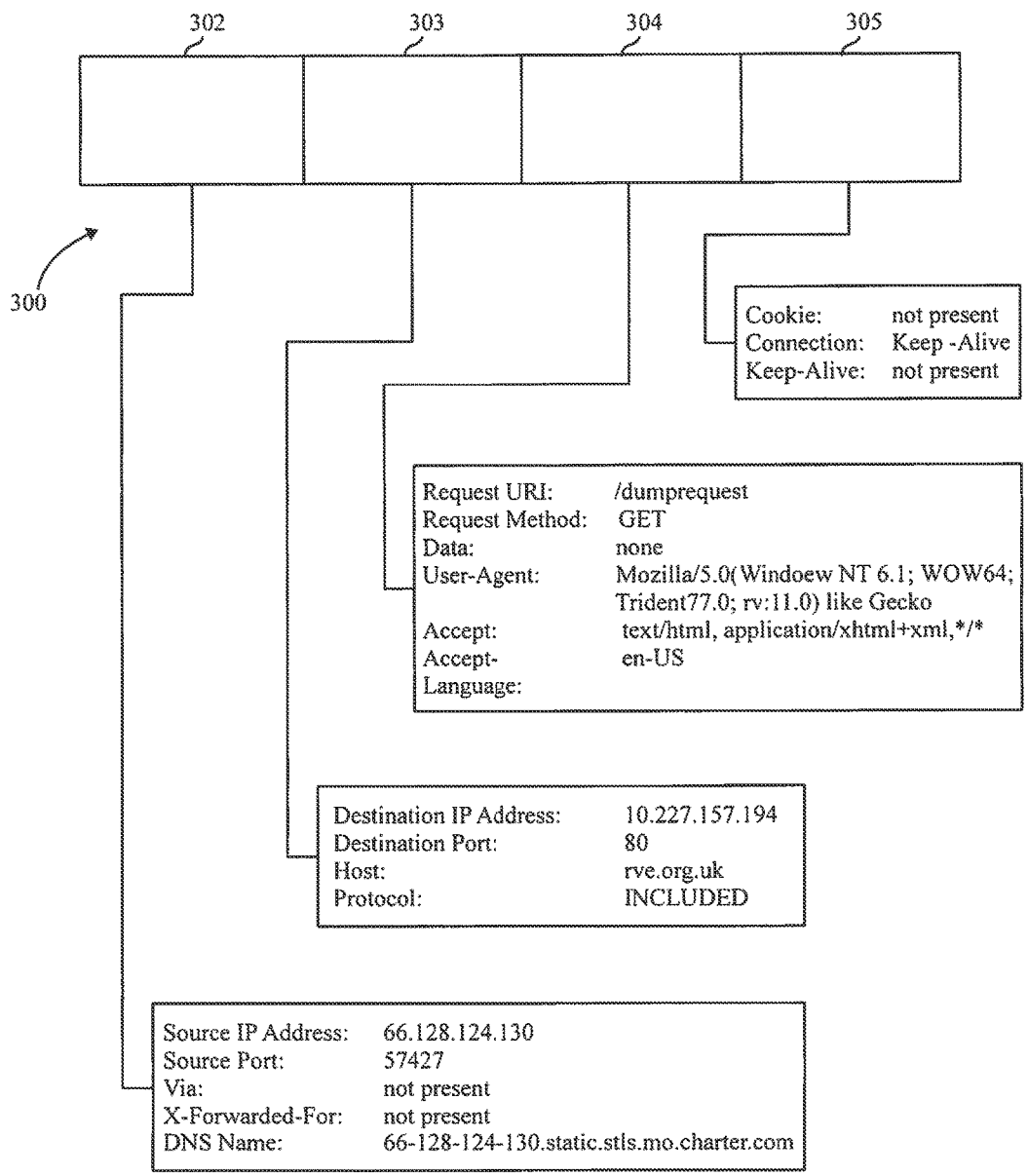
FIG. 3 illustrates examples of the types of information and headers that may be received within a HTTP request and analyzed by the Bot detection service in accordance with embodiments herein.

FIG. 3 illustrates examples of the types of header fields or properties of interest that may be received within a HTTP request in accordance with embodiments herein. A HTTP request 300 includes various header portions 302-305 that contain different properties of interest (POIs). A non-limiting list of examples of the request POIs, in a HTTP request, include the source IP address, source port, via header, X-forward-for a header, destination IP address, destination port, host, protocol, requested URL, request method, request content, user agent, except header, accept header, accept language header, referring page, cookies, connection control, cache control, authorization and the like. The request POIs may also correspond to header fields.

In the example of FIG. 3, the HTTP request 300 was sent from address: 66.128.124.130 and the port number used was 57427. Optionally, one or more proxy servers may be provided between the proxy service 112 (FIG. 1A) and the client/Bot computing device 115, 116. If the HTTP request includes the POI/header "Via", or "X-Forwarded-For", that is an indication that there is at least one proxy server somewhere along the line. If neither of the Via or X-forward-for POIs/headers were present, that could mean that no proxy servers were involved, or it could mean that the proxy servers chose not to "reveal" themselves by adding those headers.

As one example, the IP address may be utilized to identify a DNS name. For example, the IP address 66.128.124.130 may be determined to have the DNS name: 66-128-124-130.static.stls.mo.charter.com. Based on the IP address and DNS name, the general location of the source of the HTTP request on the Internet may be determined, such as the source city, the ISP and the like.

In the example of FIG. 3, the destination IP address is 10.227.157.194, while the destination port is 80. The host is RVE.org.uk, while the protocol is "included". The destination information indicates the network service attempting to be contacted. The requested URI is/dumprequest. Together with the 'Host' POI/header and the destination port number (above), the URI specifies the document that is to be retrieved. In the present example, the values indicate that the URL of the document which is being requested is: http://rve.org.uk/dumprequest.

In the example of FIG. 3, the request method is GET, while another example may be POST. For example, when a client/Bot computing device 115, 116 fills in and submits a request, it may generate a POST request (or it might be "GET"), whereas the client/Bot computing device 115, 116 you just click on a link, or activate one of your browser's "bookmarks" or "favorites", then the request method will always be "GET". Therefore, if the request method is "POST", this is an indication that a form was submitted. In addition, the contents of the form would appear in the HTTP request, and there would also be some "Content-" headers describing the data. In general, Web browsers generate two kinds of "POST" data: either "multipart/form-data", which is used when uploading files to a Web server, or the more common "application/x-www-form-urlencoded". Optionally, the use of POST request method or the type of POST data may represent one trait indicative of human traffic behavior.

Another property of interest when analyzing an HTTP request for human traffic behavior, is the user agent. The user agent describes the Web browser used in connection with initiating a network session and generating the HTTP request. Typically, the user agent contains the browser name and version (e.g. Firefox 1.0.7), the Operating System and version (e.g. Windows XP), and possibly additional information, such as which "service packs" are installed. In the example of FIG. 3, the user agent is Mozilla/5.0 (Windows NT 6.1; WOW64; Trident/7.0; rv:11.0) like Gecko. The "Accept" POI describes the type of information the Web browser can handle, and what the Web browser would prefer to receive when there is a choice. The "Accept" POI describes which document types the Web browser can handle. For example, the example of FIG. 3 indicates that the browser is capable of handling "image/png" graphics.

The "Accept-Charset" POI describes what character sets are acceptable, from which estimates may be made as to what part of the world the client/Bot computing device 115, 116 is located, and what language is spoken. For example, western European or North American users quite possibly only understand the "iso-8859-1", "us-ascii" and "utf-8" character sets, whereas "big5" may suggest that the client/Bot computing device 115, 116 may be Chinese. The "Accept-Encoding" POI describes the ability of the Web browser to handle compressed transfer of documents. The "Accept-Language" POI indicates the language(s), in which the client/Bot computing device prefers to receive documents. For example, if the POI indicates a preference is "en-gb" followed by "en", that may indicated that the user is an English-speaking Briton, whereas the value "pt-br" would suggest a Portuguese-speaking Brazilian.

The "referer" POI indicates which document referred the client/Bot computing device 115, 116 to the network service 110, namely the links followed to get to the current network resource (e.g., Web page). As one example, the "referer" POI represents the URL of the page from which the client/Bot computing device 115, 116 came to get to the represent network resource. Optionally, the client/Bot computing device 115, 116 may not follow a link. For example, the client/Bot computing device 115, 116 may simply clicked on a browser "bookmark" or may type the address of a particular network resource/page directly into a browser, in which case the "referer" POI may be omitted.

Another property of interest in an HTTP request is the "cookie" header field. Every time a Web server provides a response (a page, a graphic, etc.), the Web server has the opportunity to send a "cookie". Cookies are small pieces of information that a browser stores, and then sends back to the same Web server whenever the browser subsequently requests a document. Thus, a cookie is only sent back to the same Web site, from which the cookie originated in the first place, and the "contents" of the cookie (the data it contains) can only be made up of whatever information the Web server already knew anyway. For example, a Web server can't just say "send me a cookie containing your e-mail address" unless that same Web server had already sent that information in the first place. The existence and management of cookies may represent a trait analyzed by the human confidence module 130 for human traffic behavior features.

The "connection control" header fields (Connection and Keep-Alive) are used to fine-tune the network traffic between a computing device and a network service. The "Cache control" header fields (Pragma, Cache-Control and If-Modified-Since) control caching of documents. By examining the connection control headers, the human confidence module 130 can detect when a browser "refresh" button of a client/Bot computing device 115, 116 forces the network resource/page to reload. For example, Mozilla (Netscape 6) sets Cache-Control to "max-age=0" when the "reload" button is entered. MSIE 5.5 sets Cache-Control to "no-cache" when a "hard" reload is entered (while holding down the "control" key).

Figure 4:
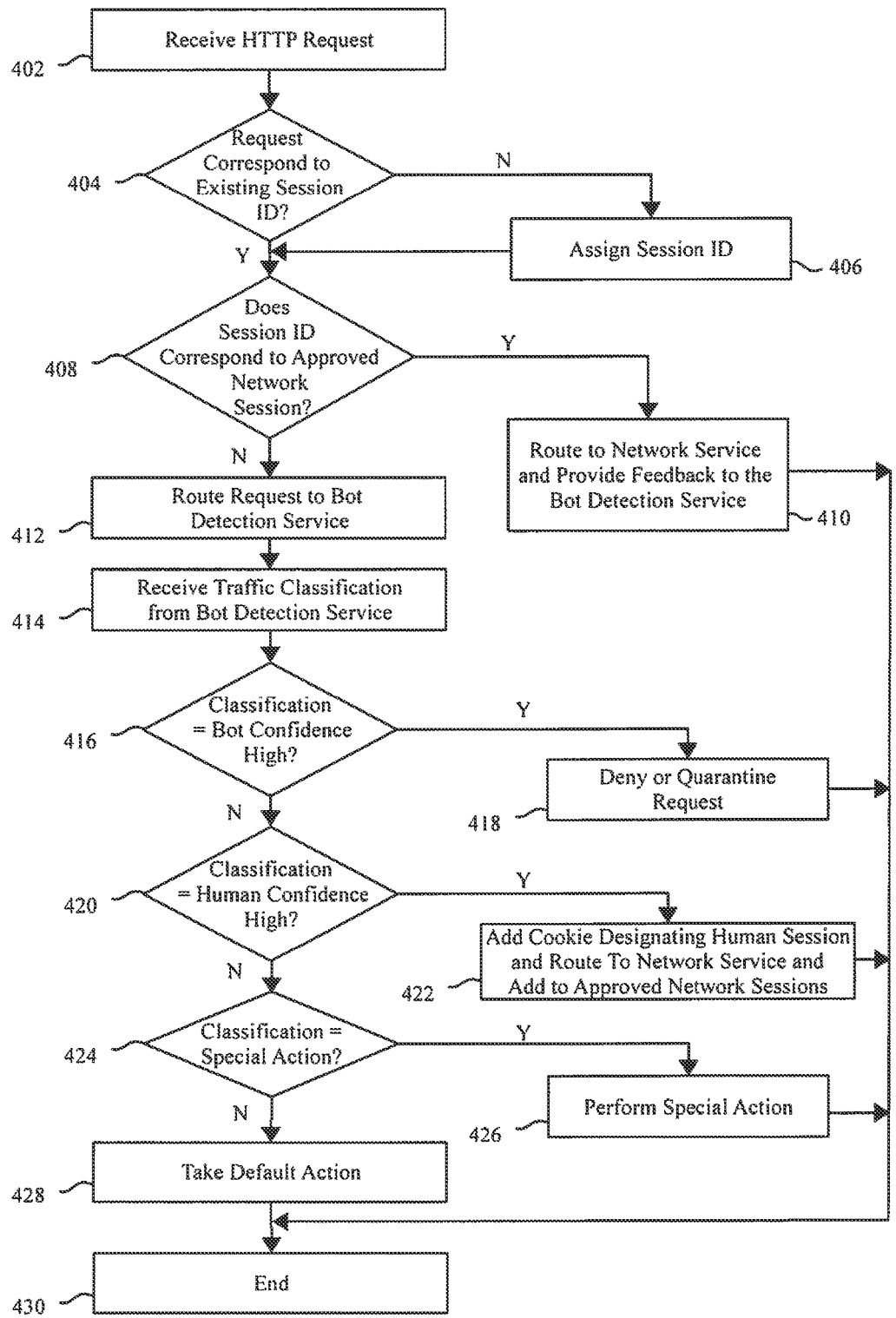
FIG. 4 illustrates a process implemented by the proxy server of FIG. 1A in accordance with embodiments herein.

FIG. 4 illustrates a process implemented by the proxy service 112 (FIG. 1A) in accordance with embodiments herein. At 402, the proxy service receives a request (e.g., an HTTP request) from a candidate computing device, such as a client or Bot computing device 115, 116 (FIG. 1A). At 404, the proxy service 112 determines whether the HTTP request corresponds to an existing session. For example, the proxy service 112 may determine whether the HTTP request includes a session ID. When the HTTP request includes a session ID indicating that the HTTP request is part of a pre-existing session, flow moves to 408. Otherwise, flow moves to 406. At 406, the proxy service assigns a session ID to the HTTP request. For example, the session ID may represent a unique number that the proxy service 112 or network service 110 has previously assigned to the client or Bot computing device 115, 116 that originated the HTTP request. The session ID is assigned for the duration of that session, namely the duration of the visit by the client or Bot computing device to the network service. The session ID can be stored as a cookie, form field, or URL (Uniform Resource Locator). The proxy service or network service may generate session IDs by simply incrementing static numbers. Alternatively, the proxy service or network service may use algorithms that involve more complex methods, such as factoring in the date and time of the visit along with other variables defined by the server administrator.

At 408, the proxy service 112 determines whether the session ID corresponds to an approved network session, such as a network session that has already been determined to correspond to a client computing device 115 being operated by a human. The proxy service 112 may include local memory, or be communicatively coupled to memory such as the data store 122 in FIG. 2A, that stores a list of approved network sessions. A network session may be approved for various reasons. For example, once an HTTP request is classified to correspond to a client computing device 115 associated with a human, the proxy service 112 (or the Bot detection service 118) may add the session ID to an approved network session list. As another example, when authorized types of Bots are identified, a network session may be established and assigned a designation that the network session corresponds to an authorized Bot. At 408, when a session ID is identified to be approved or to correspond to a human-based network session, flow moves to 410. Otherwise, flow advances to 412.

At 410, the proxy service 112 routes the HTTP request to the network service 110 and no further Bot detection is performed in connection with the HTTP request. Thereafter, the network service 110 may directly respond to the request or route a response through the proxy service 112. At 412, the HTTP request is routed to the Bot detection service 118 (FIG. 1A). Thereafter, the proxy service 112 waits for a response from the Bot detection service 118, namely a traffic classification indicating the nature of the HTTP request. Optionally, at 410 the proxy service 112 also provides feedback data to the robot detection service 118. For example, the feedback data may inform the robot detection service 118 that a request has been received in connection with an approved network session. The feedback data may also include additional information regarding the request. The robot detection service 118 may utilize the feedback data to track request in connection with approved network sessions, even though the robot detection service 118 does not analyze the details of such request. For example, the robot detection service 118 may identify behavior or patterns from the feedback data that indicate that the request may no longer represent a human-based request, in which case, the robot detection service 118 may remove the network session from the approved list.

Optionally, the decision at 408 regarding whether a session ID corresponds to an approved network session may be based on a cookie or other content added to a session instance by the Bot detection service 118. For example, once a Bot detection service 118 performs the operations described herein and determines that an HTTP request corresponds to a client computing device 115 of a valid user, the response (ultimately provided by the network service 110) may set a cookie or other portion of the header to declare subsequent HTTP requests in the same network session to be approved. The proxy service 112 may review the cookies or other portion of the header for the "approved" designator and, when the "approved" designator is present, the proxy service 112 may pass the HTTP request to the network service 110 (at 410).

At 414, (after the Bot detection service 118 performs the corresponding analysis as explained herein), the proxy service 112 receives a traffic classification from the Bot detection service 118. At 416, the proxy service 112 determines whether the classification indicates a Bot confidence high, thereby indicating a strong likelihood that the HTTP request corresponds to a Bot based request. When a Bot confidence high classification is returned, flow moves to 418. At 418, the proxy service 112 denies the request or quarantines the request. Optionally, the proxy service 112 may process the request in other manners associated with Bot-based request.

Returning to 416, when the classification does not correspond to a Bot confidence high, flow advances to 420. At 420, the proxy service 112 determines whether the classification indicates a human confidence high, thereby indicating a strong likelihood that the HTTP request corresponds to a human based request. When a human confidence high classification is returned, flow advances to 422. At 422, the proxy service 112 adds content to the HTTP request to indicate that the HTTP request is human-based. For example, the proxy service may add a cookie designating the HTTP request to correspond to a human session. At 422, the proxy service then routes the HTTP request to the network service 110.

Returning to 420, when the classification does not indicate a human confidence high, flow advances to 424. At 424, the proxy service 112 determines whether the classification corresponds to a special action designation. If so, flow advances to 426 where a corresponding special action is taken. Otherwise, flow moves to 428 where the proxy service 112 performs a default operation relative to the HTTP request. For example, a default setting may be established, such that when the HTTP request is not identified with a high confidence to correspond to a Bot or human or warrant some other special action, the proxy service 112 may pass the HTTP request to the network service. Alternatively, the default setting may direct the proxy service 112 to deny the HTTP request. Thereafter, the process ends at 430. The operations of FIG. 4 are carried out repeatedly by one or more processors that define the proxy service 112. The operations of FIG. 4 generate different responses to the HTTP request based the classification of the HTTP request.

Figure 5:
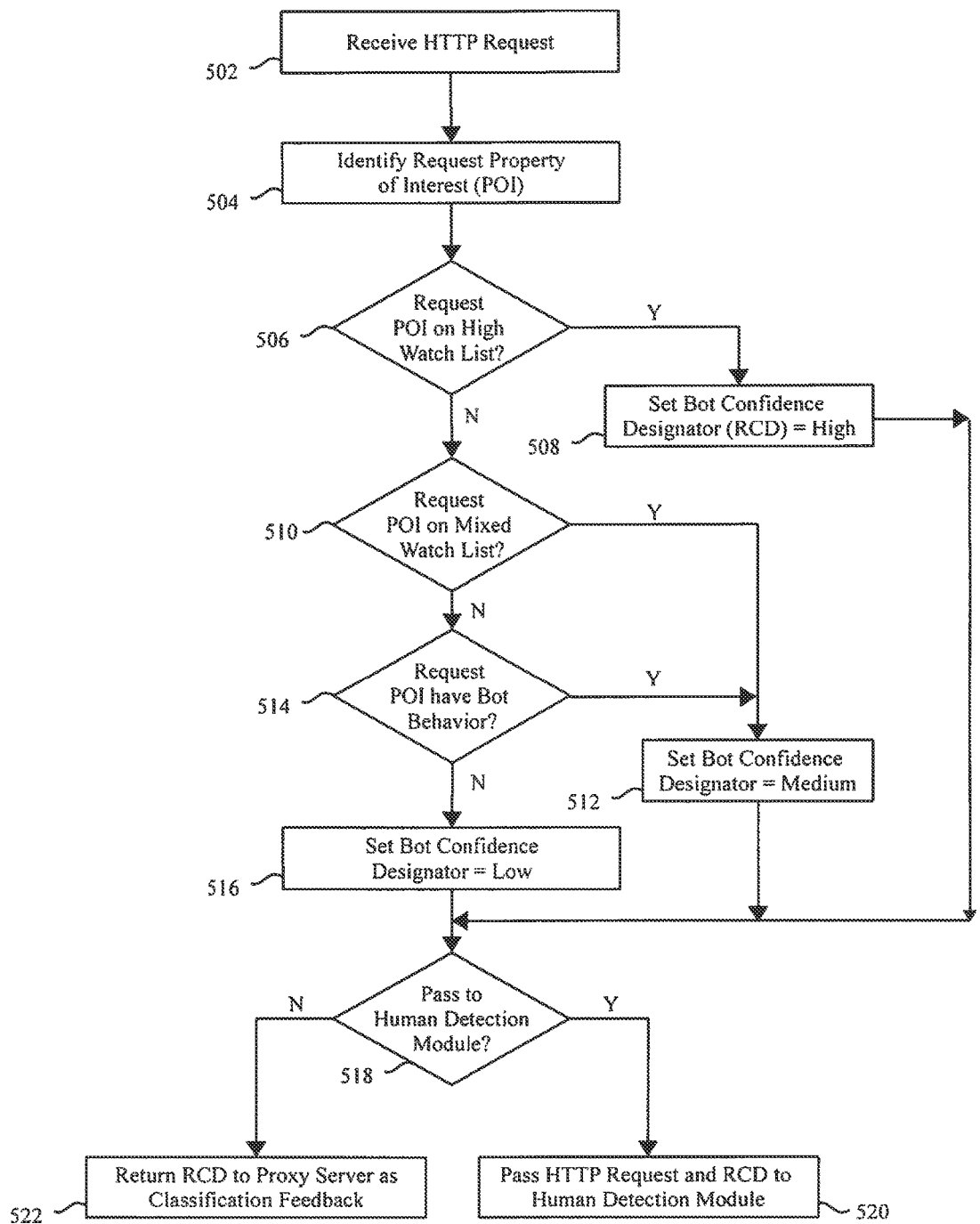
FIG. 5 illustrates a Bot detection process carried out by the Bot confidence module in accordance with embodiments herein.

FIG. 5 illustrates a Bot detection process carried out by one or more processors defining the Bot confidence module 120 in accordance with embodiments herein. At 502, the Bot confidence module 118 (FIG. 2A) receives the HTTP request. At 504, the header parser 210 parses through the HTTP request to identify one or more request properties of interest (POI). At 506, the watch list comparator 212 accesses one or more list in the watch list 222. The comparator 212 determines whether the property of interest is identified on a high watch list. The high watch list may contain IP addresses known to be associated primarily with Bots. For example, when the POI corresponds to the IP address, the comparator 212 searches a blocked list of IP addresses for the IP address associated with the incoming HTTP request. If the IP address within the HTTP request is on the blocked list, flow moves from 506 to 508. At 508, the confidence rating module 214 sets the confidence module as "Bot confidence high".

Returning to 506, when the request POI is not on the high watch list, flow advances to 510. At 510, the comparator 212 determines whether the property of interest is on a mixed watch list. The mixed watch list may contain IP addresses known to be associated with some Bots, but also with numerous human users. When the POI corresponds to the IP address, the comparator 212 searches the mixed watch list of IP addresses for the IP address associated with the incoming HTTP request. If the IP address of the HTTP request is on the mixed watch list, flow moves to 512. At 512, the confidence rating module 214 sets the Bot confidence designation as "Bot confidence medium."

Returning to 510, when the request POI does not match an item on the mixed watch list, flow advances to 514. At 514, the confidence rating module 214 may perform additional analysis upon the property of interest to determine whether the HTTP request exhibits other Bot behavior. Examples are discussed herein of various header properties, other than the IP address, that may be associated with a Bot. If the analysis at 514 determines that the request POI has Bot behavior, flow advances to 512 where the Bot confidence designation is set as "Bot confidence medium." Otherwise, flow moves to 516.

At 516, the confidence rating module 214 sets the Bot confidence designation as "Bot confidence low." Following the designator settings at 508, 512 and 516, flow moves to 518. At 518, the Bot confidence module 120 determines whether to pass the HTTP request to the human confidence module 130. The HTTP request may not always be passed to the human confidence module 130, such as when the POI is on a high watch list leading to a higher confidence that the HTTP request is associated with a Bot. When it is determined to pass the HTTP request to the human confidence module 130 flow advances to 520. At 520, the HTTP request and the Bot confidence designation (determined from the operations at 506-516) are passed to the human confidence module 130. Alternatively, when it is determined at 518 that no further analysis is needed, flow moves to 522 where the Bot confidence designation is passed to the proxy service 112 as the traffic classification feedback.

Optionally, the decision at 518 may be varied to increase or decrease the coverage of (extent of use) the human confidence module 130. For example, when it is desirable to increase the coverage, namely increase the overall number of sessions and potential proxy services 112 supported, the decision at 518 would only pass HTTP requests to the human confidence module 130, for which a low Bot confidence has been identified. When the Bot confidence is medium or high, the Bot confidence designation may be passed to the proxy service 112 without double checking for potential human behavior. Alternatively, when it is desirable to decrease false positives (i.e. falsely identified Bots) the decision at 518 would pass all HTTP requests to the human confidence module 130, even when the Bot confidence designation is set medium or high. By passing all HTTP request to the human confidence module 130, the system ensures a double check for potential human behavior in connection with all request passed from the proxy service 112 to the Bot detection service 118.

Figure 6:
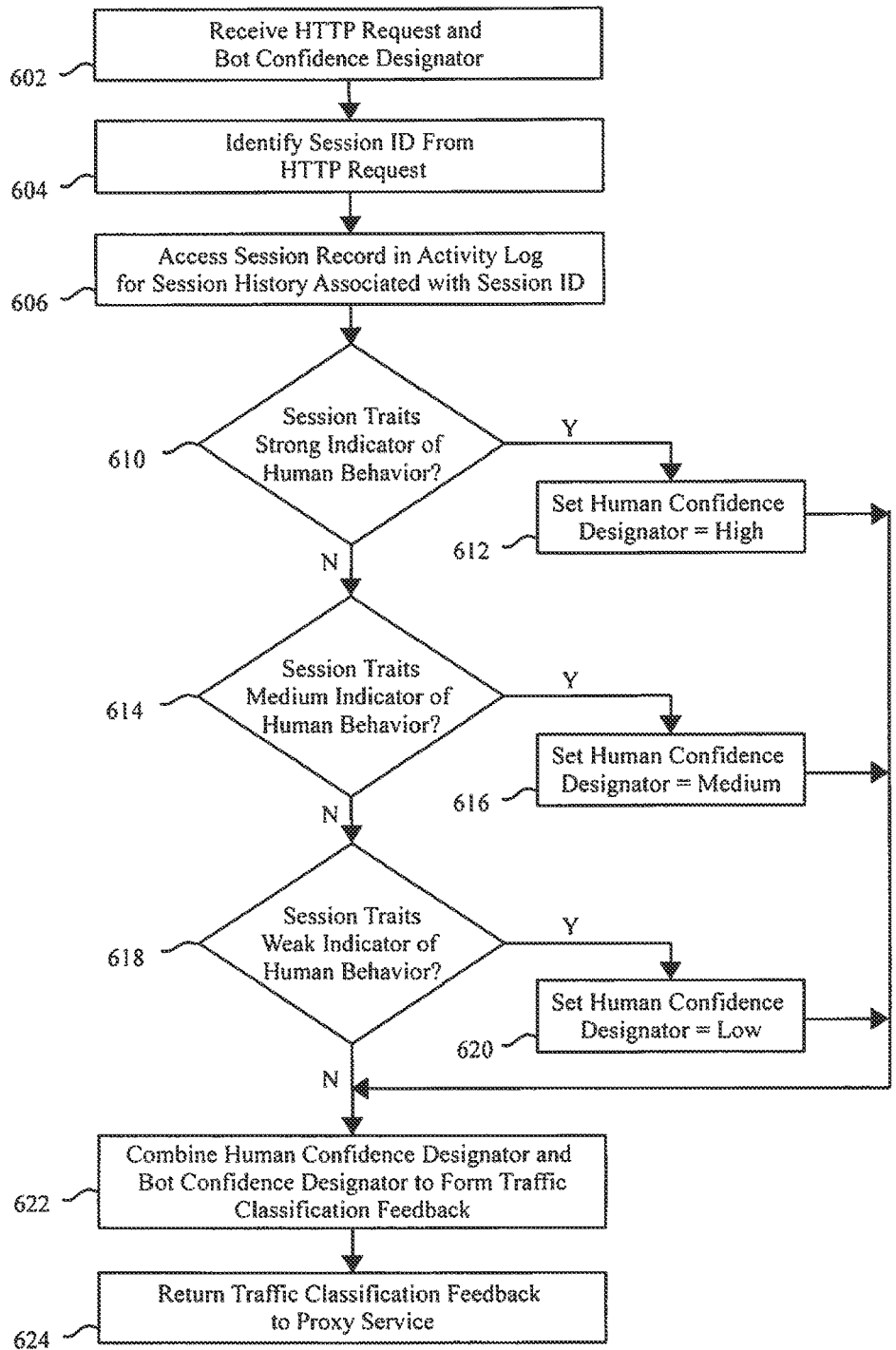
FIG. 6 illustrates a human detection process carried out by the human confidence module in accordance with embodiments herein.

FIG. 6 illustrates a human detection process carried out by the human confidence module 130 (FIG. 2A) in accordance with embodiments herein. At 602, the human confidence module 130 receives the HTTP request and the Bot confidence designation assigned during the process of FIG. 5. At 604, the human confidence module 130 identifies a session ID from the HTTP request. At 606, the log manager 226 accesses the activity log 220 to obtain a session record containing a session history associated with the session ID. At 610-618, the confidence rating module 228 analyzes the activity data from the session history in connection with one or more session trait models 230 (FIG. 2A) and 270, 280, 290 (FIG. 2C). As explained above in connection with FIG. 2B, the log manager 226 updates the session record with the activity data from the HTTP request.

At 610, the confidence rating module 228 determines whether the analysis of the activity data represents a strong indicator of human behavior. For example, the session trait model 230 may analyze activity data that includes at least one of a number of webpages visited using website visit model 270 (FIG. 1B), a time spent at each webpage using visit duration model 280, or an overall session duration using session length model 190. The model(s) 270, 280, 290 may have one or more thresholds associated with various session traits. For example, human behavior may be strongly indicated when the number of webpage visits is within a select range, and the time spent at one or more of the webpages is within a select duration. As another example, the model(s) 270, 280, 290 may include a minimum threshold for an overall session duration before it is considered to be indicative of human behavior.

When a strong indicator of human behavior is identified, flow advances to 612. At 612, the confidence rating module 228 sets the human confidence designation as "human confidence high". Thereafter, flow advances to 622.

Alternatively, at 610 when the session trait(s) are not a strong indicator of human behavior, flow advances to 614. At 614, the confidence rating module 228 (and session trait model 230) determines whether the traits represent a medium indicator of human behavior. When a medium indicator of human behavior is identified, flow moves to 616, where the human confidence designation is set as "human confidence medium". Thereafter, flow advances to 622.

Alternatively, at 614 when the traits are not a medium indicator of human behavior, flow advances to 618. At 618, the confidence rating module 228 (and session trait model 230) determines whether the traits represent a low indicator of human behavior. When a low indicator of human behavior is identified, flow moves to 620, where the human confidence designation is set as "human confidence low". Thereafter, flow advances to 622.

At 622, the human confidence designation is combined with the Bot confidence designation to form traffic classification feedback. The human and Bot confidence designations may be combined in various manners. As one example, a weighted sum may be used where different weightings are assigned to the human and Bot confidence designations. Thereafter, at 624, the traffic classification feedback is returned to the proxy service 112.

The Bot detection services described herein may be utilized in connection with various network services. For example, the Bot detection services may be utilized to protect e-commerce servers, such as by locating the Bot detection service at a front end of an e-commerce service. For example, when e-commerce services offer single service deals (e.g. lightning deals), the Bot detection service may be utilized to ensure that only human users take advantage of the single service deals. Optionally, the Bot detection service may be located off-line, such as to perform metrics filtering. For example, the Bot detection service may be located in a separate data analysis system or at a data warehouse to perform off-line data analysis in connection with identifying which HTTP request were Bot-based and which HTTP request with human-based for the inventory planning or capacity planning, or otherwise making business decisions based on the metric data. As another example, the Bot detection service may be offered as a service within a platform of online services.

Optionally, the Bot detection service may be used to analyze customer behavior and to identify customer patterns of interest. The results of the analysis may be provided to personalization teams in order to improve customer experiences in connection with e-commerce and other network-based services. As a further example, the Bot detection service may be utilized by operations teams who are responsible for developing and maintaining network services (e.g. websites). The confidence designations generated by the Bot detection service may be utilized by the operations teams, such as when determining whether certain errors arising during operation of a network service are due to human interaction or Bot interaction. The confidence designations may also be used by the operations team to determine the effectiveness of another Bot detection service. For example, the confidence designations may be used for internal auditing or to otherwise understand and the effectiveness of other Bot detection systems.

Service/Device

Figure 7:
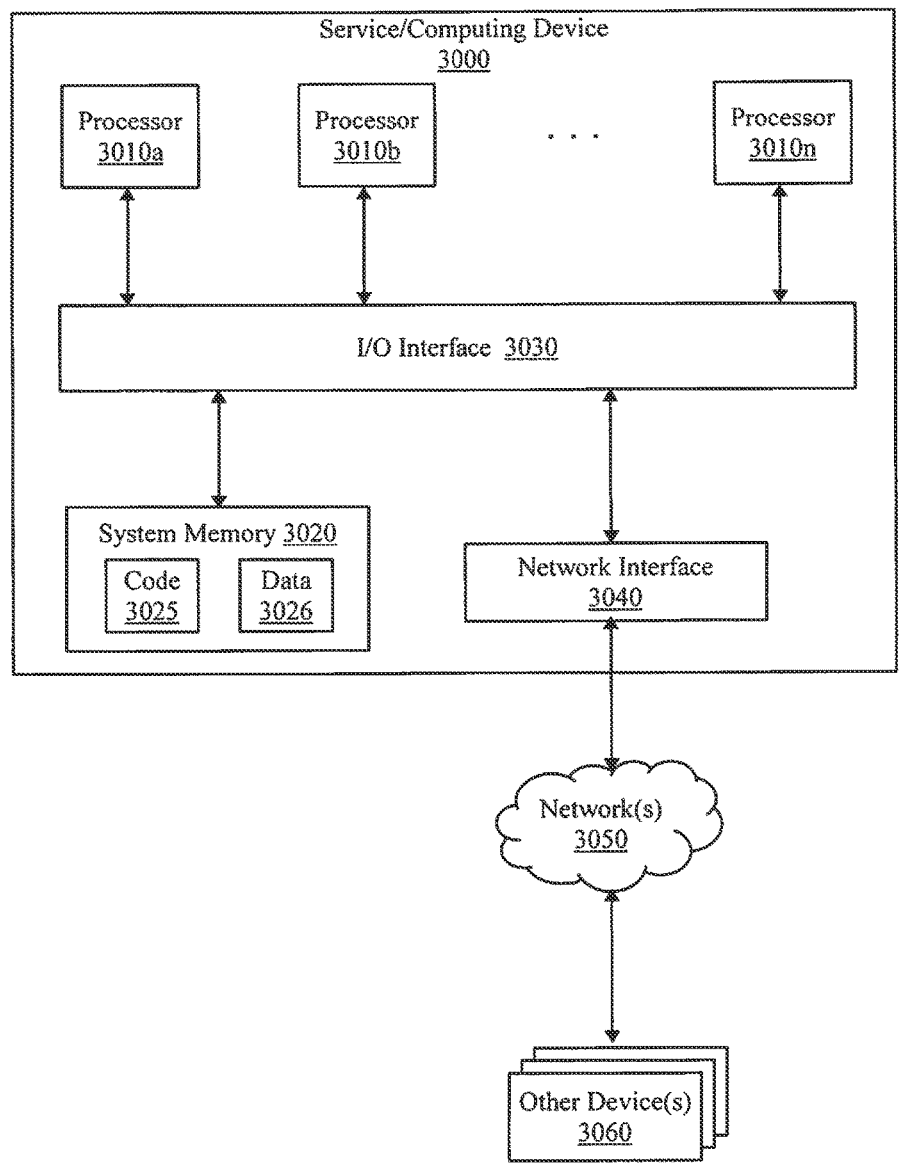
FIG. 7 illustrates a service and/or computing device configured to implement a portion or all of the operations described herein in accordance with the various services, devices and modules.

In at least some embodiments, a computer system that implements a portion or all of one or more of the technologies described herein, such as the Bot protection system, may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, the processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1-6, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

It is recognized that an HTTP request is just one example of the type requests and responses that may be utilized. The methods, systems and program products described herein are equally useful with other protocols and are more broadly applicable.

Closing

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device 510 (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/ or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must").

All references, including publications, patent applications and patents, cited herein are hereby incorporated by reference to the same extent as if each reference were individually and specifically indicated to be incorporated by reference and were set forth in its entirety herein.

What is claimed is:

1. A computer program product comprising a non signal computer readable storage medium comprising computer executable code to perform at least:
   obtain, from a computing device and in connection with a network session, a request directed to a network service to be fulfilled by the network service;
   compare a request property of interest (POI) representing at least one of a user agent or an Internet Protocol (IP) address from the request to a watch list designating sources of requests associated with computer-implemented automated agents by comparing the at least one of the user agent or the IP address to the watch list;
   assign an automated agent confidence designation based on the compare operation, the automated agent confidence designation indicating a likelihood that the request was obtained from a computer-implemented automated agent;
   as a result of the automated agent confidence designation being below a predetermined threshold:
   analyze a session trait of the network session utilizing a computer model that uses one or more predetermined session traits relative to human confidence designations; and
   assign a human confidence designation from the computer model based on the analyze operation, the human confidence designation providing an indication whether the request represents a human-based request, wherein the human-based request classifies the request as submitted via human interaction with a client device;
   determine that, based on the automated agent confidence designation and the human confidence designation, the request is an agent-based request, the agent-based request classifies the request as submitted from a computer-implemented automated agent;
   determine, as a result of determining that the request is an agent-based request, an action to restrict fulfillment of the request by the network service; and
   restrict, by performing the action, fulfillment of the request by the network service limiting the agent-based request from being directed to the network service.

2. The computer program product of claim 1, wherein the analyze operation includes analyzing the session trait from a session history recorded in connection with the network session in search of one or more predetermined session traits associated with human based requests.

3. The computer program product of claim 1, wherein the human confidence designation is based at least in part on one or more of:
   a number of webpages visited,
   an amount of time spent at a webpage, or
   an overall session duration.

4. A computer-implemented method, comprising:
   obtaining a request, in connection with a network session, from a computing device to be fulfilled by a network service;
   comparing a request property of interest (POI) representing at least one of a user agent or an Internet Protocol (IP) address from the request to a watch list designating sources of requests associated with computer-implemented automated agents, by comparing the at least one of the user agent or the IP address to the watch list;
   assigning an automated agent confidence designation based on the comparing operation, the automated agent confidence designation indicating a likelihood that the request was obtained from a computer-implemented automated agent;
   in response to the automated agent confidence designation being below a predetermined threshold, analyzing a session trait of the network session utilizing a computer model that uses one or more predetermined session traits relative to human confidence designations to determine an indication whether the request represents an agent-based request;
   determining, based at least in part on the automated agent confidence designation and the session trait, that the request is an agent-based request;
   determining, as a result of determining that the request is an agent-based request, an action to restrict fulfillment of the request by the network service; and
   restricting, by causing performance of the action, fulfillment of the request by the network service by at least limiting the agent-based request from being directed to the network service.

5. The method of claim 4, wherein the action includes declining the request when the request is determined as the agent-based request, and responding to the request when the request is determined as a human-based request.

6. The method of claim 4, wherein determining the request is an agent-based request includes processing first and second requests associated with a common IP address, classifying the first request as the agent-based request and classifying the second request as a human-based request.

7. The method of claim 4, further comprising:
   receiving first and second requests in connection with first and second network sessions:
   determining that the first and second requests originate from a common IP address associated with potential agent-based activity; and
   wherein the analyzing operation identifies the session trait of the first network session to correspond to human-based session behavior, and identifies the session trait of the second network session to not correspond to human-based session behavior.

8. The method of claim 4, further comprising assigning a human confidence designation to the request based on the analyzing operation, the human confidence designation indicating a likelihood that the request represents a human-based request.

9. The method of claim 8, further comprising combining automated agent and human confidence designations resulting in a weighted sum to form traffic classification feedback to be delivered to a proxy service.

10. The method of claim 4, wherein the session trait includes at least one of a number of webpages visited during one or more network sessions, a time spent at a webpage in connection with one or more requests or sessions, an overall duration of a network session, browser patterns followed when navigating through links on a network resource, or transitions between network resources.

11. The method of claim 4, wherein the watch list includes one or more of:
  a signature based at least in part on the IP address,
  a session associated with the request, or
  purchase history associated with the request.

12. A system, comprising:
  at least one processor; and
  memory coupled to the at least one processor, wherein the memory stores program instructions, wherein the program instructions are executable by the at least one processor to:
  obtain, from a computing device directed to a network service and in connection with a network session, a request to be fulfilled by the network service;
  compare a request property of interest (POI) representing at least one of a user agent or an Internet Protocol (IP) address from the request to a watch list designating sources of requests associated with computer-implemented automated agents by comparing the at least one of the user agent or the IP address to the watch list;
  assign an automated robot confidence designation based on the compare operation, the automated robot confidence designation indicating a likelihood that the request was obtained from a computer implemented agent;
  in response to the automated robot confidence designation being below a predetermined threshold, analyze a session trait of the network session utilizing a computer model that uses one or more predetermined session traits relative to human confidence designations to determine an indication whether the request represents an agent-based request;
  determine, based at least in part on the automated robot confidence designation and the session trait, that the request is an agent-based request;
  determine, as a result of determining that the request is an agent-based request, an action to restrict fulfillment of the request; and
  restrict, by causing performance of the action, fulfillment of the request by the network service by at least limiting the agent-based request from being directed to the network service.

13. The system of claim 12, wherein the at least one processor analyzes activity data from a session record in connection with the session trait, the session record stored in the memory and corresponding to the network session, the activity data including at least one of a number of webpages visited, a time spent at each webpage, or an overall session duration.

14. The system of claim 12, wherein the at least one processor processes first and second requests associated with a common IP address, classifies the first request as the agent-based request and classifies the second request as a human-based request.

15. The system of claim 12, wherein the at least one processor:
  receives first and second requests in connection with first and second network sessions;
  determines that first and second requests originate from a common IP address associated with potential agent-based activity;
  identifies the session trait of the first network session to correspond to human based session behavior; and
  identifies the session trait of the second network session to not correspond to human-based session behavior.

16. The system of claim 12, wherein the analyze operation includes assigning a human confidence designation to the request, the human confidence designation indicating a likelihood that the request represents a user-based request.

17. The system of claim 12, further comprising at least a first data store storing an activity log of multiple session histories, the analyze operation analyzing one of the session histories associated with the network session to determine whether the session trait is indicative of human-based session behavior.

18. The system of claim 12, further comprising a second data store storing a watch list of IP addresses known to be associated with agent activity, the compare operation comparing an IP address of the request with the watch list to determine whether the request is associated with the computer-implemented automated agents.

19. The system of claim 12, wherein the program instructions are further executable by the at least one processor to decline a second request when the second request is classified as a computer implemented automated agent based request.

20. The system of claim 12, wherein the program instructions further include instructions that are further executable by the at least one processor to:
  obtain, from another computing device, another request to be fulfilled by the network service; and
  as a result of determining that the other request was submitted by an automated software agent, deny, quarantine, or temporarily suspend the other request.

* * * * *